United States Patent
Delserro et al.

(10) Patent No.: US 12,019,853 B1
(45) Date of Patent: Jun. 25, 2024

(54) SYSTEMS AND METHODS FOR IMPLEMENTING A COLLABORATIVE SLIDESHOW PRESENTATION

(71) Applicant: Verizon Patent and Licensing Inc., Basking Ridge, NJ (US)

(72) Inventors: Anthony Delserro, Orange, CA (US); Anbazhagan Palani, Somerset, NJ (US); David Skuratowicz, Felton, CA (US); Mahabaleshwar Bhat, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/133,241

(22) Filed: Apr. 11, 2023

(51) Int. Cl.
  *G06F 3/0484* (2022.01)
  *G06F 3/0482* (2013.01)

(52) U.S. Cl.
  CPC .......... *G06F 3/0484* (2013.01); *G06F 3/0482* (2013.01)

(58) Field of Classification Search
  CPC .............................. G06F 3/0482; G06F 3/0484
  See application file for complete search history.

(56) References Cited

U.S. PATENT DOCUMENTS

| | | | |
|---|---|---|---|
| 6,304,861 B1* | 10/2001 | Ferguson | G06Q 10/10 706/15 |
| 11,601,618 B1* | 3/2023 | Slotznick | H04N 7/15 |
| 2002/0095392 A1* | 7/2002 | Ferguson | G06Q 10/10 706/15 |
| 2018/0129634 A1* | 5/2018 | Sivaji | G06F 40/106 |
| 2021/0200719 A1* | 7/2021 | Yang | G06Q 10/107 |
| 2022/0043549 A1* | 2/2022 | Seeley | G06F 16/178 |

\* cited by examiner

*Primary Examiner* — Seth A Silverman (57) ABSTRACT

An illustrative method includes executing, by a virtual meeting platform, a virtual meeting; executing, by the virtual meeting platform and during the virtual meeting, a collaborative slideshow presentation, the executing of the collaborative slideshow presentation including accessing a collaborative slideshow file from a storage location of a file sharing platform and using the collaborative slideshow file to provide, for display within a graphical user interface view, the collaborative slideshow presentation to a plurality of participants; and facilitating, by the virtual meeting platform and during the virtual meeting based on user designated control permissions, two or more participants included in the plurality of participants having concurrent control of the collaborative slideshow presentation.

19 Claims, 7 Drawing Sheets

SYSTEMS AND METHODS FOR IMPLEMENTING A COLLABORATIVE SLIDESHOW PRESENTATION

BACKGROUND INFORMATION

As computer technology has advanced, various tools have been developed to facilitate users virtually interacting with one another by way of computer systems. For example, computing platforms have been developed to facilitate live streaming video and/or audio content to audience members during a virtual meeting (e.g., an all hands-on-deck corporate meeting, a webinar, etc.). During such a virtual meeting, a presenter of the virtual meeting may initiate a screen share to present a slideshow presentation to the audience members. However, such a screen share of a slideshow presentation typically results in only one presenter controlling the slideshow presentation at a given time and/or one or more additional presenters directing navigation of the slideshow presentation in a disruptive manner. For example, the one or more additional presenters may have to continually direct the presenter in control of the slideshow presentation to move to the next slide, which is disruptive to the flow of the virtual meeting. In view of this, there remains room for improvement in implementing slideshow presentations during virtual meetings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for implementing a collaborative slideshow presentation are described herein. In certain examples, a virtual meeting platform may execute a collaborative slideshow presentation during a virtual meeting. The virtual meeting platform may facilitate two or more presenters having concurrent control of the collaborative slideshow presentation during the virtual meeting via a permissions mechanism. For example, the virtual meeting platform may leverage a file sharing platform (e.g., GOOGLE DRIVE, MICROSOFT SHAREPOINT, etc.) to facilitate slide synchronization during the virtual meeting. Moreover, the virtual meeting platform may be configured to allow a presenter to grant permissions, such as concurrent access, slide presentation control, and/or slide edit control for the collaborative slideshow presentation to others during the virtual meeting. In addition, the virtual meeting platform may provide one or more features and/or tools (e.g., user interface features and/or tools) for use by a plurality of presenters to concurrently control the collaborative slideshow presentation, interact with one or more slides, and/or with one another in relation to the virtual meeting. In some examples, the additional features and/or tools may help two or more presenters independently interact with and/or modify one or more slides of the collaborative slideshow presentation without affecting the slide currently presented to the participants during the virtual meeting.

In certain examples, for instance, an illustrative system may include a memory that stores instructions and a processor communicatively coupled to the memory and configured to execute the instructions to cause a virtual meeting platform to perform a process. The process may comprise executing a virtual meeting, executing, during the virtual meeting, a collaborative slideshow presentation. The executing of the collaborative slideshow presentation may include accessing a collaborative slideshow file from a storage location of a file sharing platform and using the collaborative slideshow file to provide, for display within a graphical user interface view, the collaborative slideshow presentation to a plurality of participants. The process may further comprise facilitating, during the virtual meeting and based on user designated control permissions, two or more participants included in the plurality of participants having concurrent control of the collaborative slideshow presentation.

Various advantages and benefits are associated with the systems and methods for implementing a collaborative slideshow presentation described herein. For example, systems and methods such as those described herein may improve flow of slideshow presentations during virtual meetings by facilitating multiple presenters having concurrent control of a collaborative slideshow presentation. Further, systems and methods such as those described herein may facilitate one or more presenters dynamically sharing slide control privileges on the fly with other participants during a collaborative slideshow presentation. In addition, the systems and methods described herein may provide one or more tools to facilitate a presenter preparing for their respective portion of the collaborative slideshow presentation during the virtual meeting without affecting what is presented to other participants during the collaborative slideshow presentation. Moreover, systems and methods such as those described herein may improve audience engagement by providing one or more tools (e.g., a virtual laser pointer, a vanishing pen, etc.) that may be used by presenters to interact with slides of a collaborative slideshow presentation. These and other benefits that may be provided by systems and methods such as those described herein will be evident from the disclosure that follows.

Figure 1:
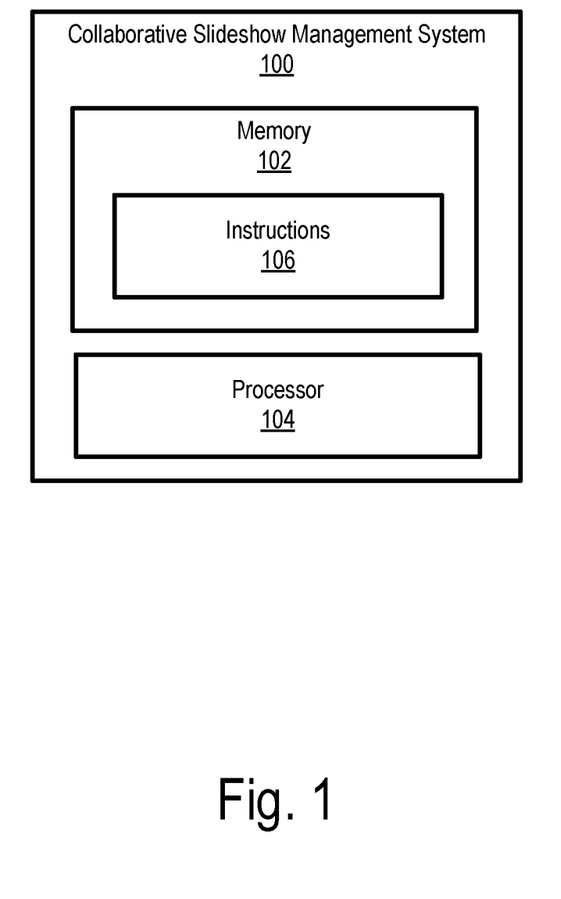
FIG. 1 shows an illustrative collaborative slideshow management system according to principles described herein.

FIG. 1 shows an illustrative collaborative slideshow management system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. In some examples, system 100 may be implemented by one or more computing devices of a live streaming platform system. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store any suitable data associated with a collaborative slideshow presentation including, slide information, presenter information, settings information, graphical user interface content, and/or any other suitable data.

Processor 104 may be configured to perform (e.g., execute instructions 106 stored in memory 102 to perform) various processing operations associated with implementing a collaborative slideshow presentation. For example, processor 104 may perform one or more operations described herein to provide one or more features and/or tools to presenters during a virtual meeting, such as by providing one or more graphical user interface views configured to facilitate collaborative control of a collaborative slideshow presentation. These and other operations that may be performed by processor 104 are described herein.

Figure 2:
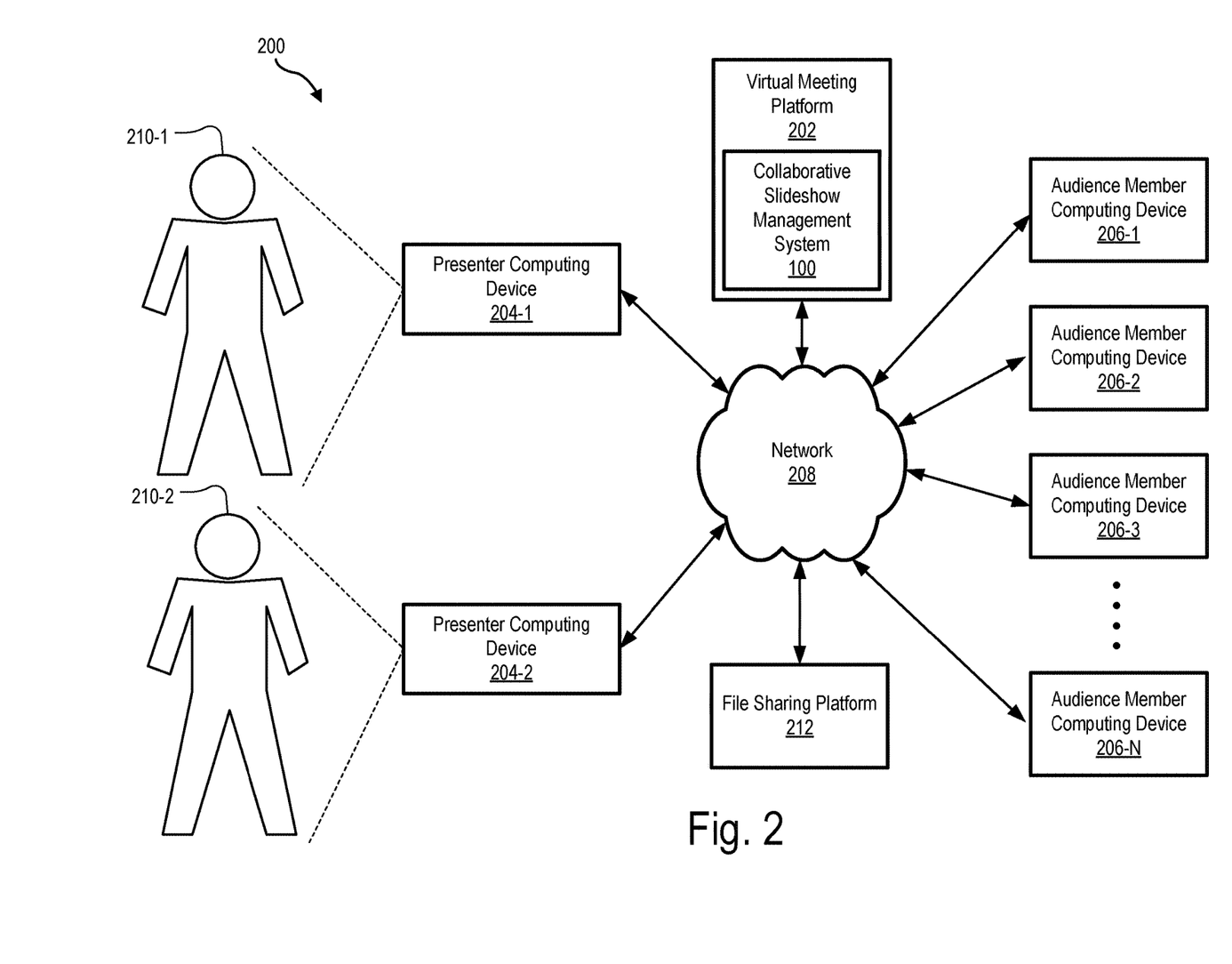
FIG. 2 shows an illustrative implementation of the collaborative slideshow management system of FIG. 1 according to principles described herein.

System 100 may be implemented in any suitable manner. FIG. 2 shows an illustrative implementation 200 in which system 100 may be provided in certain examples. As shown in FIG. 2, implementation 200 includes a virtual meeting platform 202 that is communicatively connected to presenter computing devices 204 (e.g., presenter computing devices 204-1 and 204-2) and any suitable number of audience member computing devices 206 (e.g., audience member computing devices 206-1 through 206-N) by way of a network 208. Presenter computing devices 204 and audience member computing devices 206 may be implemented by any suitable type of computing device or combination of computing devices as may serve a particular implementation. For example, presenter computing devices 204 and/or audience member computing devices 206 may be implemented by a desktop computer, a laptop computer, a smartphone, a tablet computer, a head mounted display device, a virtual reality ("VR") device, an augmented reality ("AR") device, an internet-of-things ("IoT") device, and/or any other suitable device. Although only two presenter computing devices 204 are shown in FIG. 2, it is understood that there may be any suitable number of presenter computing devices as may serve a particular implementation.

Virtual meeting platform 202 may be associated with a virtual meeting service provider that hosts and/or facilitates virtual meetings such as those described herein. BLUE-JEANS STUDIO by VERIZON is an example of a virtual meeting service provider that may implement virtual meeting platform 202 in certain examples. Virtual meeting platform 202 may include any suitable computing device or combination of computing devices as may serve a particular implementation. For example, virtual meeting platform 202 may include one or more servers and/or other computing devices that may be configured to facilitate virtual meetings and collaborative slideshow presentations being provided by way of audience member computing devices 206 to audience members and/or by way of presenter computing devices 204 to presenters 210. Virtual meeting platform 202 may provide any suitable features and/or tools (e.g., user interface features and/or tools) for use by presenters 210 in collaboratively controlling a collaborative slideshow presentation. Examples of tools and/or features that may be provided by virtual meeting platform 202 are described further herein.

In the example shown in FIG. 2, system 100 is depicted as being part of virtual meeting platform 202. With such a configuration, it is understood that virtual meeting platform 202 may be configured to perform all of the operations associated with system 100 in certain examples. In certain alternative implementations, system 100 may be implemented by presenter computing devices 204, audience member computing devices, or any other suitable computing device. Alternatively, system 100 may be distributed across audience member computing devices 206, presenter computing devices 204, and virtual meeting platform 202, or distributed across audience member computing devices 206, presenter computing devices 204, virtual meeting platform 202, and/or any other suitable computing system/device.

As shown in FIG. 2, a file sharing platform 212 may be communicatively connected to virtual meeting platform 202, presenter computing devices 204, and audience member computing devices 206. File sharing platform 212 may be configured to facilitate collaborative control of a collaborative slideshow presentation by providing a service configured to facilitate file storage and/or file synchronization. To that end, file sharing platform 212 and/or system 100 may be configured to facilitate granting file access control and/or file edit control to users with respect to any suitable files (e.g., slideshow files) managed by file sharing platform 212. In certain examples, such files may be version controlled by system 100 such that presenters may have automatic access to the most updated files (e.g., slideshow slides) during the collaborative slideshow presentation. In this regard, system 100 may provide native file support as opposed to a participant merely sharing a file by way of a screen share during a virtual meeting. Such files may be stored at any suitable storage location. In certain examples, such files may be stored at a storage location (e.g., a server) managed by file sharing platform 212. Additionally or alternatively, such files may be stored by virtual meeting platform 202, presenter computing devices 204, audience member computing devices 206, or distributed across virtual meeting platform 202, presenter computing devices 204, and audience member computing devices 206. File sharing platform 212 may correspond to any suitable type of file sharing platform configured to facilitate file storage and/or file synchronization as may serve a particular implementation. For example, file sharing platform 212 may be implemented by GOOGLE DRIVE, MICROSOFT SHAREPOINT, and/or any other suitable file sharing platform.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between virtual meeting platform 202, presenter computing devices 204, audience member computing devices 206, and file sharing platform 212. Communications between virtual meeting platform 202, presenter computing devices 204, audience member computing devices 206, file sharing platform 212, and any other system/device may be transported using any one of the above-listed networks, or any combination or sub-combination of the above-listed networks.

As will be described further herein, system 100 (e.g., virtual meeting platform 202) may be configured to perform one or more operations associated with implementing a collaborative slideshow presentation. As used herein, a "collaborative slideshow presentation" may include any type of communication session in which a plurality of slides are presented to one or more audience members participating in a virtual meeting and where two or more presenters participating in the virtual meeting collaboratively share concurrent control of the presentation of the plurality of slides in the virtual meeting. For example, a collaborative slideshow presentation may include system 100 presenting PowerPoint slides to remotely located participants, where the system 100 facilitates concurrent and/or tiered control of the presentation of the slides by two or more of the participants. In certain examples, a collaborative slideshow presentation may be configured such that a presenter may share less control abilities with one participant than other participants. For example, a primary or main presenter may have full navigation control, edit control, etc. whereas a secondary presenter may only be authorized to have navigation control. In certain examples, a collaborative slideshow presentation may be configured such that two or more presenters may have concurrent control of the collaborative slideshow presentation and may be concurrently presenting during the collaborative slideshow presentation. In certain alternative examples, a collaborative slideshow presentation may be configured such that two or more presenters may have concurrent control of the collaborative slideshow presentation but only one presenter may be currently presenting at a given time. In such examples, the other presenters not currently presenting may be provided with one or more graphical user interface views such as those described herein to facilitate preparing for their portion of the collaborative slideshow presentation (e.g., by browsing slides, editing slides, making notes, etc.). In certain examples, system 100 may maintain or otherwise control a permissions list that indicates which participants are authorized to control a collaborative slideshow presentation during a virtual meeting. For example, a permissions list may indicate that a first participant, a second participant, and a third participant are each authorized to concurrently control navigation of slides during a collaborative slideshow presentation, concurrently edit slides during the collaborative slideshow presentation, and/or concurrently interact with a collaborative slideshow presentation during a virtual meeting in any other suitable manner.

To that end, system 100 may be configured to execute a virtual meeting. As used herein, a "virtual meeting" may refer to any suitable communication session where users in different physical locations may use their respective mobile or internet connected computing devices (e.g., presenter computing devices 204, audience member computing devices 206, etc.) to meet in a same virtual room. During a virtual meeting, the audience members may use interfaces of their computing devices to join and participate in the collaborative slideshow presentation, such as by viewing slides, consuming the live streaming audio and/or video content, and optionally virtually interacting with the collaborative slideshow presentation and/or presenter(s).

System 100 may execute a virtual meeting in any suitable manner. For example, system 100 may provide meeting invites to participants by way of presenter computing devices 204 and/or audience member computing devices 206, provide meeting reminders, initiate the virtual meeting at a predefined time, provide audio and/or video content to presenter computing devices 204 and/or audience member computing devices 206, and/or perform any other suitable operation that may be associated with executing a virtual meeting.

During the virtual meeting, system 100 may execute a collaborative slideshow presentation. As used herein, to "execute" a collaborative slideshow presentation by system 100 means that virtual meeting platform 202 hosts and runs the collaborative slideshow presentation as opposed to a slideshow presentation being implemented by way a conventional screenshare where, for example, a presenter computing device executes a slideshow program and images of the slideshow program displayed on the screen of the presenter computing device are provided to other participants during a virtual meeting.

System 100 may execute the collaborative slideshow presentation in any suitable manner. For example, system 100 may execute any suitable slideshow file (e.g., a PowerPoint file) during the virtual meeting to initiate the collaborative slideshow presentation. In certain examples, system 100 may receive a slideshow presentation file uploaded from a presenter prior to or during a virtual meeting. System 100 may then execute the uploaded slideshow presentation file during the virtual meeting to initiate the collaborative slideshow presentation. In certain alternative examples, system 100 may additionally or alternatively access a slideshow file from file sharing platform 212, one of presenter computing devices 204, and/or from any other suitable storage location. In such examples, system 100 may access the slideshow file by leveraging file sharing platform access permissions of a presenter such as the presenter's login and password information used to access a file sharing platform. System 100 may then execute the accessed slideshow file by, for example, integrating slide presentation content of the slideshow file into virtual meeting content, such as by combining data feeds to form an output video feed of a graphical user interface view such as those described.

In certain examples, system 100 may facilitate sharing of control privileges during a virtual meeting based on user designated control permissions. To that end, in certain examples, system 100 may receive, during the virtual meeting, a user input to grant control of the collaborative slideshow presentation to an additional participant included in the plurality of participants. System 100 may receive the user input in any suitable manner. For example, system 100 may detect a user input provided by way of a user-selectable control option represented in any suitable graphical user interface such as those described herein. Based on the user input, system 100 may grant the additional participant control of the collaborative slideshow presentation concurrently with the two or more participants. This may be accomplished in any suitable manner. For example, system 100 may update a permissions list to include the additional participant as a participant that is authorized to control the collaborative slideshow presentation and/or make changes to slides represented during the collaborative slideshow presentation.

In certain examples, system 100 may grant different levels or types of control of the collaborative slideshow presentation to different participants. For example, system 100 may grant a first level or type of control to a first participant, a second level or type of control to a second participant, and a third level or type of control to a third participant. The first, second, and third levels or types of control may be different from one another. For example, a first participant may not have permission to control or access slides (e.g., may only be authorized to view slides during the collaborative slideshow presentation). A second participant may have permission to access slides from file sharing platform 212 but may not be authorized to control the collaborative slideshow presentation during the virtual meeting. A third participant may have permission to access and control presentation of the slides during the collaborative slideshow presentation. A fourth participant may have permission to access and control presentation of the slides during the collaborative slideshow presentation and may further have permission to share access and/or control of the slides to other participants during the collaborative slideshow presentation. A fifth participant may have permission to access and control presentation of the slides during the collaborative slideshow presentation but may not have permission to share access and/or control of the slides to other participants during the collaborative slideshow presentation. A sixth participant may have permission to access slides, share slides, and/or share control of and/or access to slides during the collaborative slideshow presentation but may not be authorized to access the slides outside of the virtual meeting. In such examples, the sixth participant may leverage another participant's file sharing platform access permissions or credentials to access and/or control the slides during the collaborative slideshow presentation.

In certain examples, only participants that have prior access permissions to a slideshow file managed by file sharing platform 212 may be granted permission to access and/or control slides during a collaborative slideshow presentation. In certain alternative examples, participants that do not have access permissions to a slideshow file managed by file sharing platform 212 may be granted access and/or control permissions during the collaborative slide show presentation. In certain examples, such permissions granted during the collaborative slideshow presentation may last only for the duration of the virtual meeting. Alternatively, such permissions granted during the collaborative slideshow presentation may persist after the virtual meeting ends.

In certain examples, all of the participants that are granted permission to access and/or control slides during a collaborative slideshow presentation may be authorized to assign/revoke permissions granted to other participants. In certain alternative examples, only a subset of the presenters may be authorized to assign/revoke permissions granted to other participants. For example, only one presenter included in a plurality of presenters may be authorized to assign/revoke permissions granted to other participants in certain examples.

Figure 3:
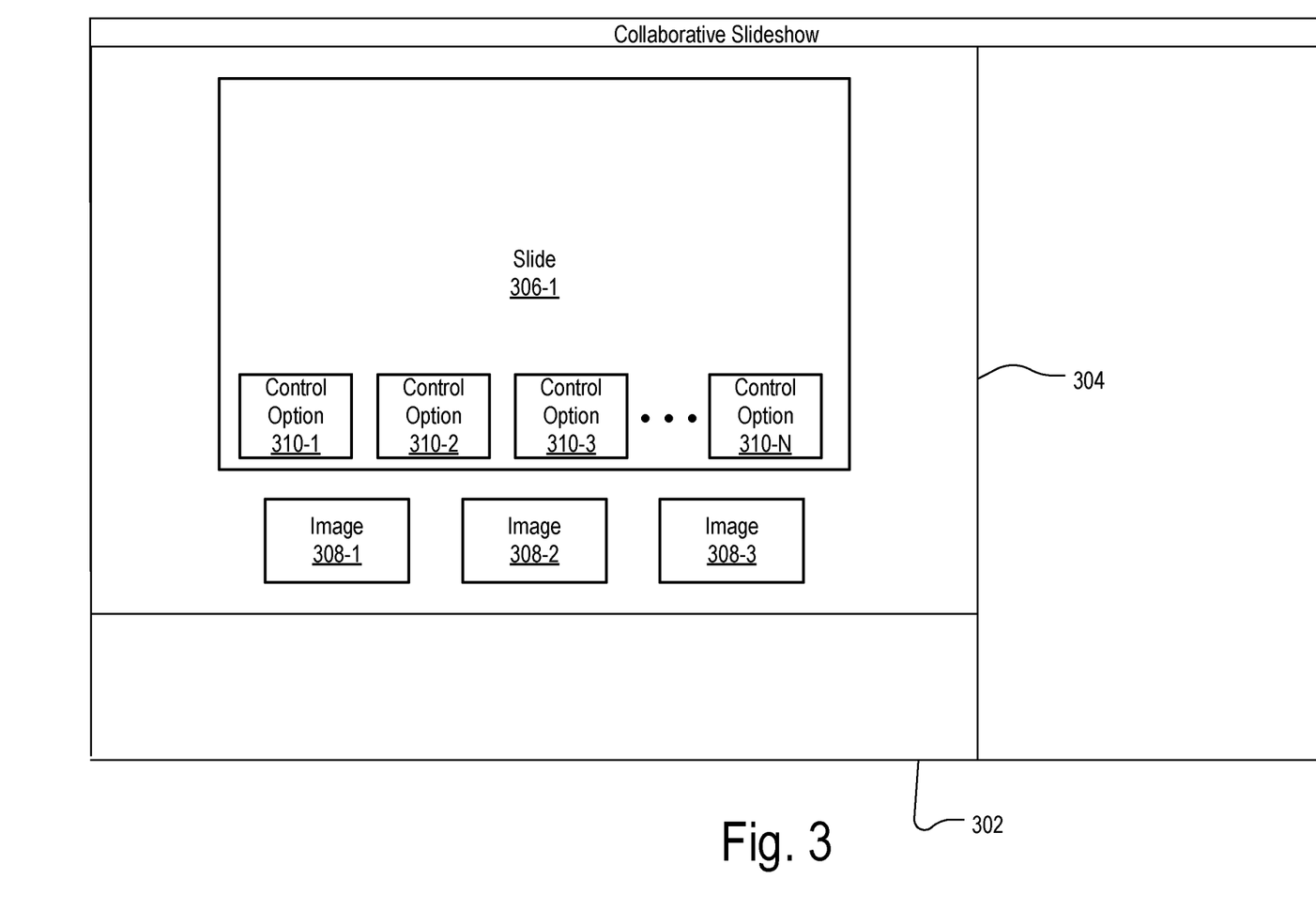
FIGS. 3-5 show illustrative graphical user interface views that may be provided for display during a virtual meeting according to principles described herein.

The executing of the collaborative slideshow presentation may include system 100 providing, during the virtual meeting and for display within a graphical user interface view, the collaborative slideshow presentation to a plurality of participants. The graphical user interface view may be implemented in any suitable manner as may serve a particular implementation. FIG. 3 shows an illustrative graphical user interface view 302 that may be provided for display in certain implementations. As shown in FIG. 3, graphical user interface view 302 includes a slide presentation pane 304 that depicts a slide 306-1 included in a plurality of slides 306 of a collaborative slideshow presentation. Slide presentation pane 304 may depict the collaborative slideshow presentation as viewed by a plurality of participants during the collaborative slideshow presentation. With such a configuration, the presenters of the collaborative slideshow presentation may be able to visualize at all times what the audience members are currently seeing during the collaborative slideshow presentation. In this regard, slide presentation pane 304 may function as a confidence measure for the presenters during the collaborative slideshow presentation because the presenters know that the audience members see whatever happens in slide presentation pane 304. As such, there is no question as to what slide the presenters are on or whether the presenters are presenting an intended slide.

In certain examples, a slide presentation pane may further depict a plurality of images of participants to the collaborative slideshow presentation. For example, a slide presentation pane may depict a first image representative of a participant that has concurrent control of the collaborative slideshow presentation and a second image representative of at least one other participant included in a plurality of participants. To illustrate, slide presentation pane 304 shown in FIG. 3 further depicts images 308 (e.g., images 308-1 through 308-3) that may be displayed in certain examples. Images 308 may each be associated with a different audience member or presenter participating in the collaborative slideshow presentation. For example, image 308-1 may be associated with presenter 210-1, image 308-2 may be associated with presenter 210-2, and image 308-3 may be associated with an additional audience member or presenter during the collaborative slideshow presentation. Although three total images 308 are shown in FIG. 3, it is understood that any suitable number of images may be represented within slide presentation pane 304 as may serve a particular implementation.

Images 308 may correspond to any suitable type of image that may be used to represent an audience member or a presenter during the collaborative slideshow presentation. For example, images 308 may correspond to live video images, still images, computer generated avatars, generic profile images, or any other suitable representation. In certain examples, the use of an image and/or the type of image used for images 308 may be selectable by participants during the collaborative slideshow presentation.

As mentioned, it may be desirable to provide two or more presenters (e.g., presenters 210) of a collaborative slideshow presentation with various tools/features that facilitate the presenters concurrently controlling the collaborative slideshow presentation. For example, system 100 may provide any suitable user interface tools/features or combination of user interface tools/features that may help the presenters interact with slides during the collaborative slideshow presentation.

To that end, in certain examples, a slide presentation pane may further depict one or more user-selectable control options that facilitate presenters collaboratively interacting with slides during a collaborative slideshow presentation. Such user-selectable control options may be represented within a slide presentation pane in any suitable manner. To illustrate an example, FIG. 3 depicts a plurality of user-selectable control options 310 (e.g., user-selectable control options 310-1 through 310-N) that may be selected by a user to interact with a collaborative slideshow presentation. In the example shown in FIG. 3, user-selectable control options are overlaid over slide 306-1. However, in certain alternative implementations, user-selectable control options 310 may be provided in any suitable manner within slide presentation pane 304 (e.g., to either side of, above, or below slide 306-1).

User-selectable control options 310 may include any suitable type of control option that may facilitate two or more presenters controlling and/or interacting with a collaborative slideshow presentation. For example, user-selectable control options 310 may include a laser pointer feature, a slide navigation feature, a share control feature, a begin slideshow feature, a draw feature, an access a slide preview feature, a vanishing pen feature, and/or any other suitable feature. To illustrate an example, user-selectable control option 310-2 may facilitate two or more presenters concurrently drawing on or making notes on slide 306-1 during the collaborative slideshow presentation. In another example, user-selectable control options 310-3 may facilitate two or more users having concurrent control of whether to go forward to a next slide or back to a previous slide during the collaborative slideshow presentation. Accordingly, it is not necessary for one presenter to ask another presenter to provide an input to move to the next slide or a previous slide. In another example, user-selectable control option 310-1 may be selectable by a presenter to grant collaborative control (e.g., either full control or partial control) of the collaborative slideshow presentation to another participant in addition to those presenters that already have collaborative control of the collaborative slideshow presentation. In addition, control option 310-1 may be selectable by a presenter to remove and/or modify the collaborative control granted to the presenter or to another presenter.

In certain examples, graphical user interface views such as those described herein may further include a presenter dashboard pane that may be individually presented to each participant that is in collaborative control of the collaborative slideshow presentation. That is, each presenter may be provided with their own presenter dashboard pane that they may navigate and control independently from other presenters.

A presenter dashboard pane may include one or more user-selectable features that facilitate presenters interacting with a plurality of slides during a collaborative slideshow presentation. For example, a presenter dashboard pane may depict one or more slides of a collaborative slideshow presentation. In certain examples, the slides depicted in the presenter dashboard pane may be browsable and selectable by a presenter independently from a slide that is currently depicted in a slide presentation pane. With such a configuration, system 100 may be configured to facilitate presenters editing, browsing, or performing any other suitable action with respect to the slides without such actions affecting or changing the slide currently displayed in the slide presentation pane.

A presenter dashboard pane may include any suitable user-selectable feature that may facilitate participants collaboratively interacting with the plurality of slides during the collaborative slideshow presentation as may serve a particular implementation. For example, a presenter dashboard pane may include a notes section where a presenter may take notes with respect to slides of a collaborative slideshow presentation. Additionally or alternatively, a presenter dashboard pane may include an option to actively update or synchronize slides included in the plurality of slides based on changes made to the slides in the presenter dashboard pane.

A presenter dashboard pane may be provided for display within a graphical user interface view at any suitable time. In certain examples, system 100 may provide a presenter dashboard pane for display in response to a user input provided with respect to a user-selectable option (e.g., control option 310-2) displayed in slide presentation pane 304.

Figure 4:
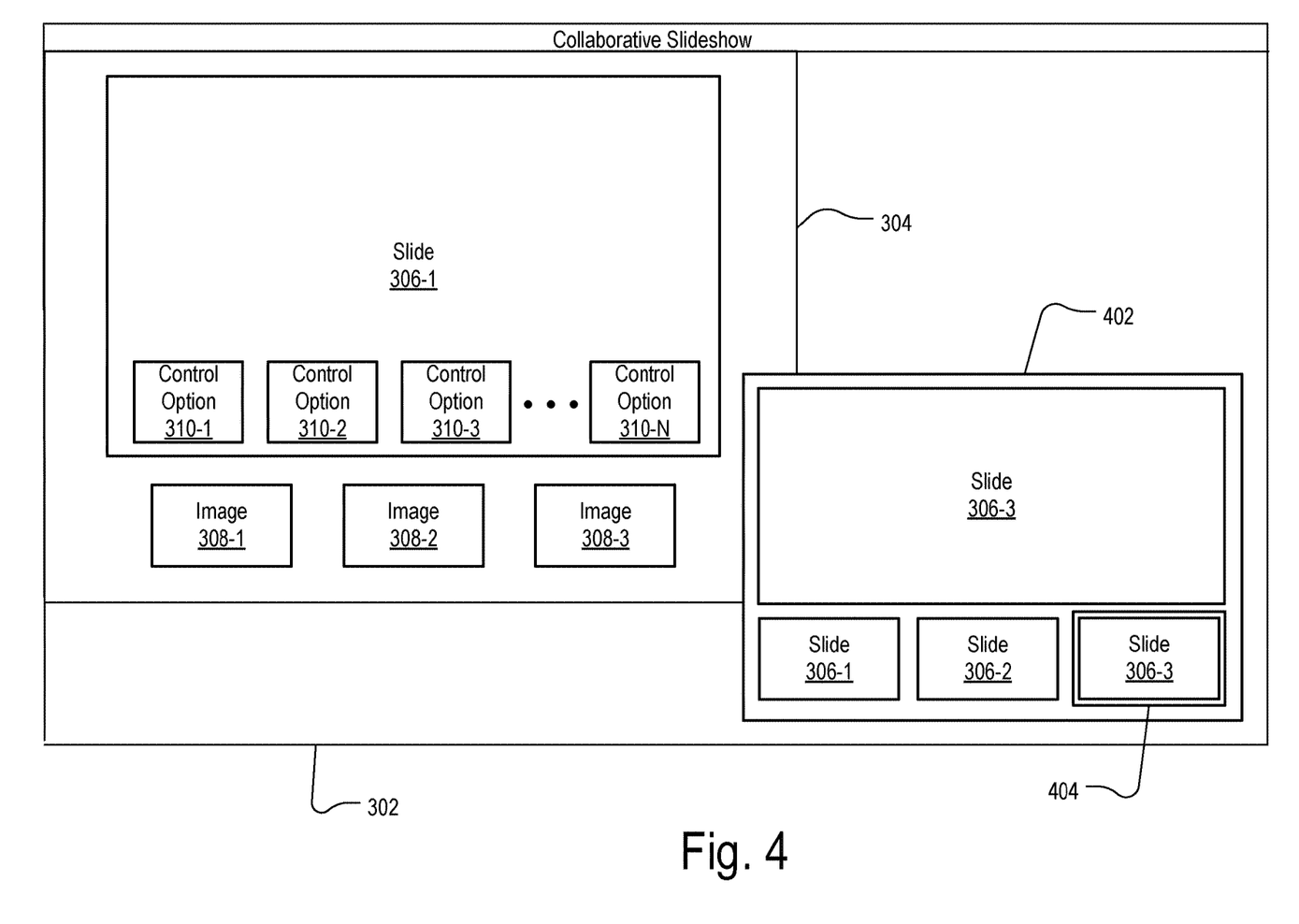

A presenter dashboard pane may be represented in a graphical user interface view in any suitable manner. To illustrate an example, FIG. 4 depicts an example of a presenter dashboard pane 402 that may be provided for display in graphical user interface view 302 together with slide presentation pane 304. As shown in FIG. 4, presenter dashboard pane 402 may include a relatively larger depiction of slide 306-3 and relatively smaller depictions of slides 306-1 through 306-3. A cursor window 404 is provided with respect to the smaller depiction of slide 306-3 to indicate that slide 306-3 is currently selected to be viewed within the main area of presenter dashboard pane 402.

Through presenter dashboard pane 402, a presenter may preview and browse through different slides 306 without changing which slide is currently depicted in slide presentation pane 304. For example, presenter 210-1 may move cursor window 404 from slide 306-3 shown in FIG. 4 to slide 306-2 to cause a relatively larger version of slide 306-2 to be displayed within presenter dashboard pane 402 instead of the relatively larger version of slide 306-3. However, such a cursor movement does not change slide 306-1 from being displayed within slide presentation pane 304.

Moreover, a presenter may make edits to slides represented within presenter dashboard pane 402. In certain examples, system 100 may automatically synchronize such edits with slides depicted in slide presentation pane 304. In certain alternative implementations, the synchronization may be delayed or performed by system 100 in response to a user input to synchronize the edits.

In the example shown in FIG. 4, presenter dashboard pane 402 is partially overlaid over slide presentation pane 304 in a pop-out window. However, presenter dashboard pane 402 may be depicted together with slide presentation pane 304 in any other suitable manner as may serve a particular implementation. For example, presenter dashboard pane 402 may be provided to the left of, to the right of, above, or below slide presentation pane 304 in certain alternative implementations.

Figure 5:
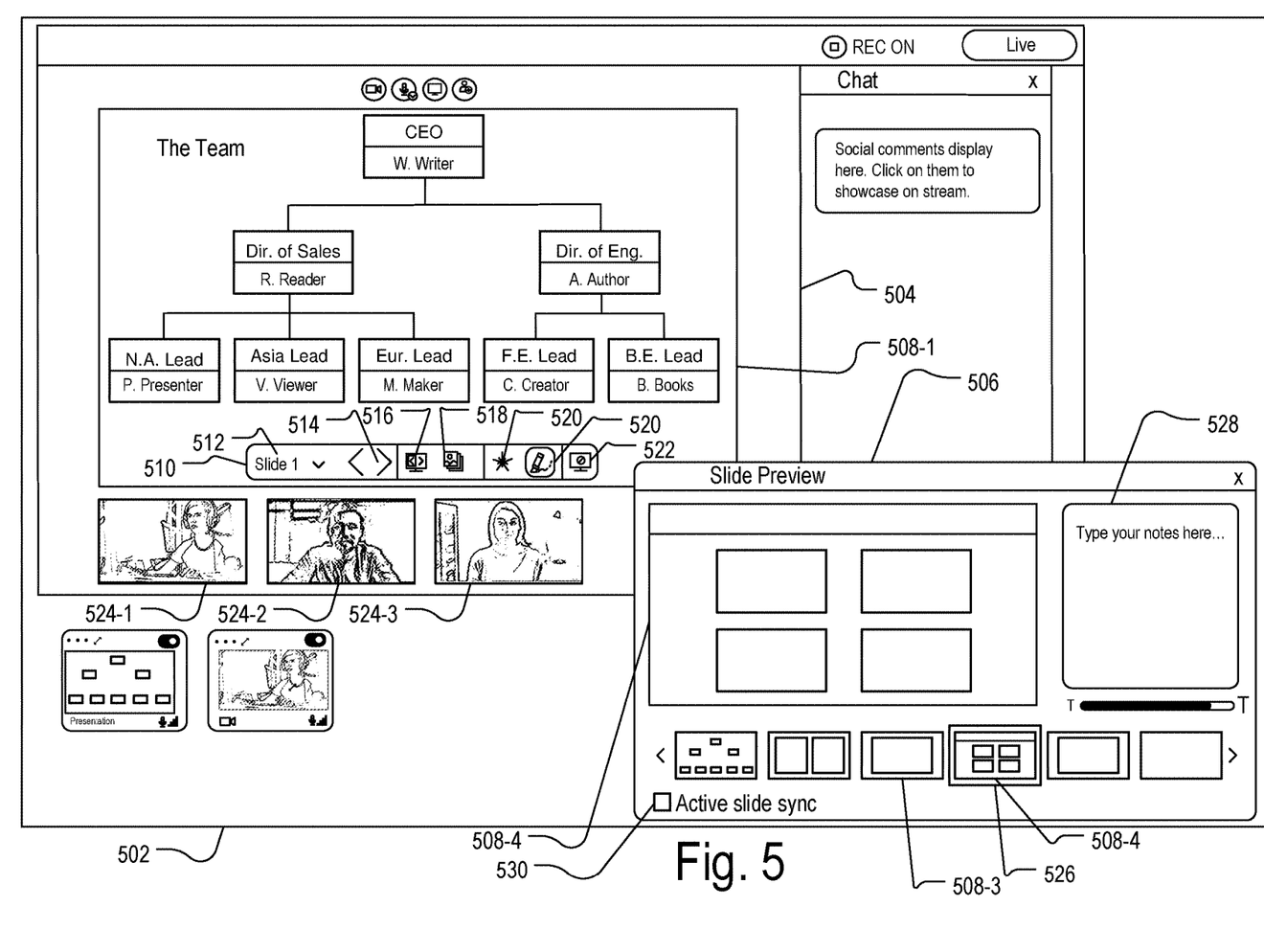

FIG. 5 shows an additional illustrative graphical user interface view 502 that may be provided for display by system 100 to a presenter during a collaborative slideshow presentation. As shown in FIG. 5, graphical user interface view 502 includes a slide presentation pane 504 and a presenter dashboard pane 506 that may be provided for concurrent display by system 100. Slide presentation pane 504 depicts a slide 508-1 included in a plurality of slides 508. Slide presentation pane 504 further depicts a user interface section 510 that includes a plurality of user-selectable options to facilitate presenters interacting with the collaborative slideshow presentation depicted in within graphical user interface view 502. For example, user interface section 510 includes an indication 512 that slide 1 is currently depicted, a user-selectable option 514 to navigate slides displayed within slide presentation pane 504 in the form of a forward and backward arrows, a user-selectable option 516 to control permissions associated with collaborative control by participants during the collaborative slideshow, a user-selectable option 518 to either access or minimize a slide preview interface (e.g., presenter dashboard pane 506), a user-selectable laser pointer option 520, a user-selectable vanishing pen option 520, and a user-selectable stop slideshow option 522.

In certain examples, selection of user-selectable option 516 may result in a pop-up window or an additional pane being presented within graphical user interface view 502 that is dedicated to permissions control. Through such a pop-up window or additional pane, a presenter may be able to select another participant from a list of participants to grant collaborative control to during the collaborative slideshow presentation. Additionally or alternatively, such a pop-up window or additional pane may facilitate a presenter removing and/or modifying control privileges of the presenter or another presenter during the collaborative slideshow presentation.

In certain examples, user interface section 510 may only be provided for display to presenters that are granted collaborative control of the collaborative slideshow presentation. In certain alternative examples, user interface section 510 may be displayed to each participant but only those granted collaborative control may interact with some or all of the user selectable options. In such examples, one or more of the user-selectable options depicted in user interface section 510 may be greyed out to indicate that they are not currently selectable by the particular participant viewing them.

As shown in FIG. 5, slide presentation pane 504 further includes a plurality of images 524 (e.g., images 524-1 through 524-3) of participants during the collaborative slideshow presentation. In the example shown in FIG. 5, images 524-1 and 524-2 may correspond to live video images of presenters that have been granted collaborative control of the collaborative slideshow presentation. Image 524-3 may correspond to a live video image of an audience member that is participating in the collaborative slideshow presentation and currently speaking. In certain examples, the images provided for display within slide presentation pane 504 may change dynamically during the collaborative slideshow presentation depending on which presenter is currently presenting and/or which participant/presenter is currently speaking.

Presenter dashboard pane 506 includes a main slide section that depicts slide 508-4 and an additional slide section that further depicts relatively smaller versions of at least some additional slides included in plurality of slides 508. The slide depicted in the main slide section may be editable by the presenter viewing presenter dashboard pane 506. The slides shown in the additional slide section may be browsable by the presenter to change which slide is depicted in the main slide section. In the example shown in FIG. 5, a cursor window 526 is provided with respect to slide 508-4, resulting in slide 508-4 being represented in the main slide section. The presenter may provide any suitable user input to cause a cursor window 526 to move and change which slide is represented within the main slide section. For example, a user input moving cursor window 526 one spot to the left may cause slide 508-3 to be displayed within the main slide section instead of slide 508-4.

In certain examples, one or more additional slides not currently shown in FIG. 5 may scroll into view upon selection of one of the arrows to the left or right of the smaller slides shown at the bottom of presenter dashboard pane 506.

In the example shown in FIG. 5, presenter dashboard pane 506 further includes a notes section 528 where a presenter (e.g., a presenter that is preparing for their portion of the presentation) may type notes during the collaborative slideshow presentation. In certain examples, the notes represented in notes section 528 may be specific to a slide that is currently displayed in the main slide section. For example, the notes provided in notes section 528 shown in FIG. 5 may be specific to slide 508-4. If the slide depicted in the main slide section is changed by, for example, cursor window 526 being moved by a presenter to the left to slide 508-3 in the additional slide section, a blank notes section or previously entered notes specific to slide 508-3 may be displayed in notes section 528. In certain examples, the size of the text presented within notes section 528 may be selectively adjusted through user input. Additionally or alternatively, the size of notes section 528 may be customized by a presenter to be relatively larger or smaller within presenter dashboard pane 506.

Presenter dashboard pane 506 shown in FIG. 5 further includes an option 530 to actively update slides included in the plurality of slides based on changes made to slides in presenter dashboard pane 506. When option 530 is selected, changes made to slides in presenter dashboard pane 506 may be updated or synchronized in real time or near real time within slide presentation pane 504. For example, a change to slide 508-1 in the main slide section of presenter dashboard pane 506 may result in the change being automatically synchronized with respect to slide 508-1 depicted in slide presentation pane 504. Alternatively, when option 530 is not selected, a presenter may make changes to slides within presenter dashboard pane 506 without those changes being automatically synchronized with the slides viewed within slide presentation pane 504.

Although the preceding description describes shared control in the context of a collaborative slideshow presentation, it is understood that concepts such as those described herein may be applied to other contexts. For example, principles such as those described herein may be used to facilitate shared control of documents, videos, audio content, and/or any other suitable type of media that may be shared with a plurality of participants during a virtual meeting.

Figure 6:
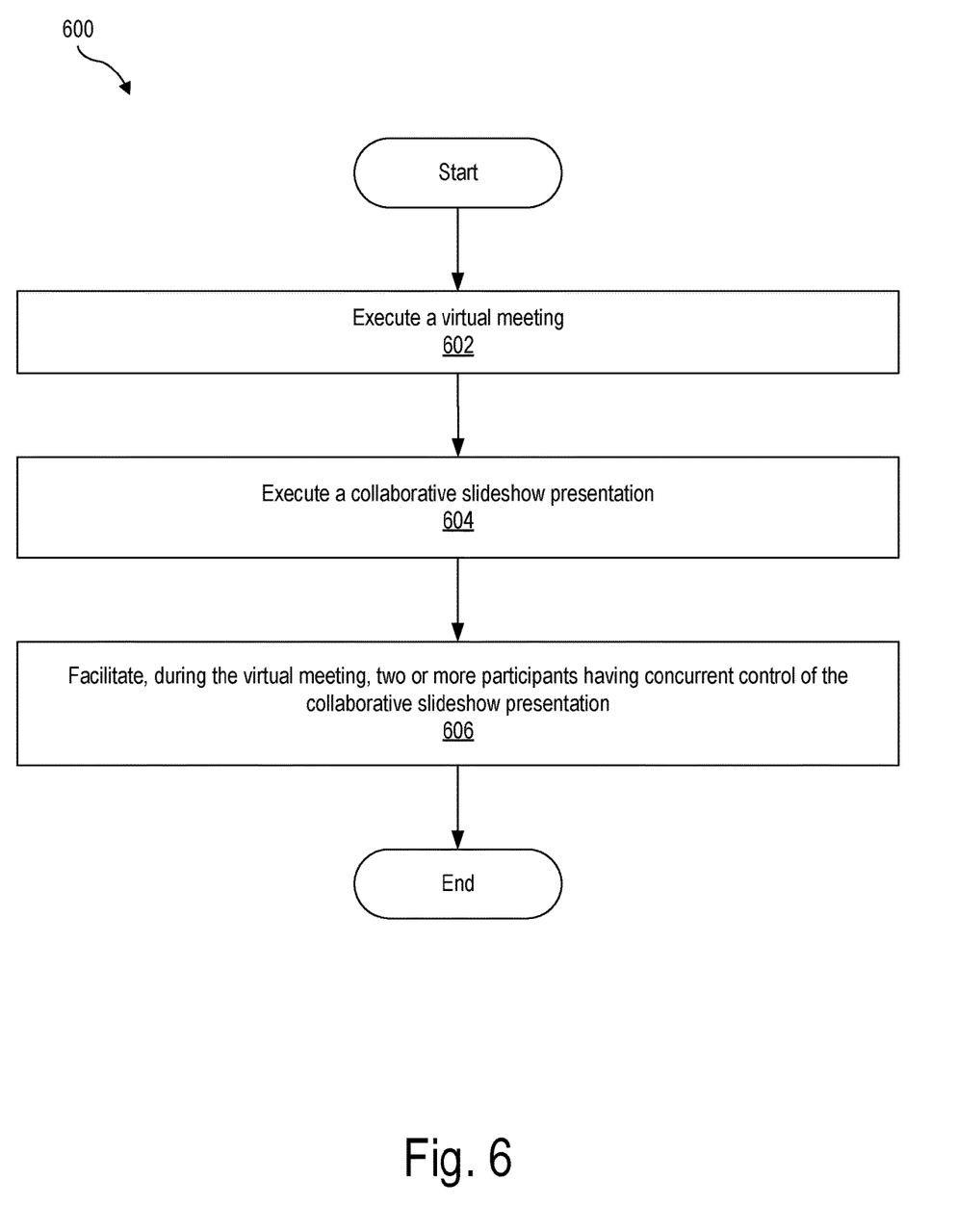
FIG. 6 shows an illustrative method for implementing a collaborative slideshow presentation according to principles described herein.

FIG. 6 depicts an illustrative method 600 for implementing a collaborative slideshow presentation. While FIG. 6 shows illustrative operations according to one embodiment, other embodiments may add to and/or modify the operations shown in FIG. 6. The operations shown in FIG. 6 may be performed by system 100, any components included therein, and/or any implementation thereof.

At operation 602, a system (e.g., collaborative slideshow management system 100 implemented by a virtual meeting platform such as virtual meeting platform 202) may execute a virtual meeting. Operation 602 may be performed in any of the ways described herein.

At operation 604, the system may execute a collaborative slideshow presentation. The executing of the collaborative slideshow presentation may include accessing a collaborative slideshow file from a storage location of a file sharing platform and using the collaborative slideshow file to provide, during the virtual meeting and for display within a graphical user interface view, the collaborative slideshow presentation to a plurality of participants. Operation 604 may be performed in any of the ways described herein.

At operation 606, the system may facilitate, during the virtual meeting and based on user designated control permissions, two or more participants included in the plurality of participants having concurrent control of the collaborative slideshow presentation. Operation 606 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Illustrative non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Illustrative volatile storage media include, but are not limited to, RAM (e.g., dynamic RAM).

Figure 7:
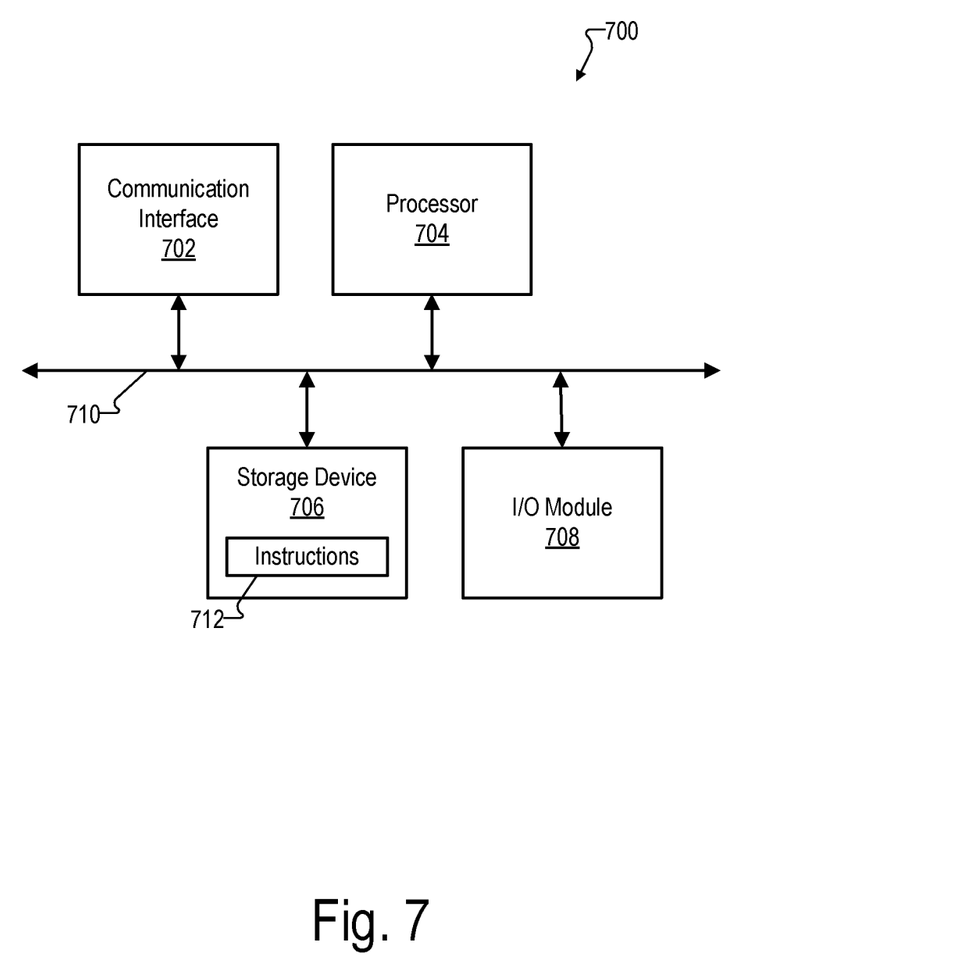
FIG. 7 shows an illustrative computing device according to principles described herein.

FIG. 7 shows an illustrative computing device 700 that may be specifically configured to perform one or more of the processes described herein. As shown in FIG. 7, computing device 700 may include a communication interface 702, a processor 704, a storage device 706, and an input/output (I/O) module 708 communicatively connected one to another via a communication infrastructure 710. While an illustrative computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit (e.g., one or more physical computer processors) capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more location databases residing within storage device 706.

I/O module 708 may include one or more I/O modules configured to receive user input and provide user output. One or more I/O modules may be used to receive input for a virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 700. For example, memory 102 may be implemented by storage device 706, and processor 104 may be implemented by processor 704.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
executing, by a virtual meeting platform, a virtual meeting during which the virtual meeting platform live streams video content to a plurality of participants;
executing, by the virtual meeting platform and during the virtual meeting, a collaborative slideshow presentation, the executing of the collaborative slideshow presentation including accessing a collaborative slideshow file from a storage location of a file sharing platform and using the collaborative slideshow file to provide, for display within a graphical user interface view, the collaborative slideshow presentation to the plurality of participants;
facilitating, by the virtual meeting platform and during the virtual meeting based on user designated control permissions, two or more participants included in the plurality of participants having concurrent control of the collaborative slideshow presentation; and
granting, by the virtual meeting platform based on a permissions control feature, a first level of control of the collaborative slideshow presentation to a first participant included in the plurality of participants during the collaborative slideshow presentation and a second level of control of the collaborative slideshow presentation to a second participant included in the plurality of participants, the first level of control different than the second level of control.

2. The method of claim 1, further comprising:
receiving, by the virtual meeting platform and during the virtual meeting, a user input to grant control of the collaborative slideshow presentation to an additional participant included in the plurality of participants; and
granting, by the virtual meeting platform and based on the user input, the additional participant control of the collaborative slideshow presentation concurrently with the two or more participants.

3. The method of claim 1, wherein the accessing of the collaborative slideshow file from the storage location of the file sharing platform includes leveraging file sharing platform access permissions of a participant included in the plurality of participants.

4. The method of claim 1, wherein:
the graphical user interface view includes a slide presentation pane that depicts a slide included in a plurality of slides of the collaborative slideshow presentation; and
the slide presentation pane depicts the collaborative slideshow presentation as viewed by the plurality of participants.

5. The method of claim 4, wherein the slide presentation pane further depicts:
a first image representative of at least one of the two or more participants that have concurrent control of the collaborative slideshow presentation; and
a second image representative of at least one other participant included in the plurality of participants.

6. The method of claim 4, wherein the slide presentation pane further depicts one or more user-selectable control options that facilitate the two or more participants collaboratively interacting with slides displayed during the collaborative slideshow presentation.

7. The method of claim 6, wherein the one or more user-selectable control options include the permission control feature and at least one of a laser pointer feature, a slide navigation feature, an access slide preview interface feature, a draw feature, or a vanishing pen feature.

8. The method of claim 1, wherein:
the permissions control feature is configured to facilitate a participant included in the plurality of participants at least one of granting collaborative control, removing collaborative control, or modifying collaborative control granted to another participant included in the plurality of participants.

9. The method of claim 4, wherein:
the graphical user interface view further includes a presenter dashboard pane that is presented individually to each of the two or more participants that collaboratively control the collaborative slideshow presentation; and
the presenter dashboard pane includes one or more user-selectable features that facilitate the two or more participants collaboratively interacting with the plurality of slides during the collaborative slideshow presentation.

10. The method of claim 9, wherein:
the presenter dashboard pane depicts additional slides included in the plurality of slides of the collaborative slideshow presentation; and
the additional slides depicted in the presenter dashboard pane are browsable and selectable by the two or more participants independently from the slide currently depicted in the slide presentation pane.

11. The method of claim 9, wherein the presenter dashboard pane includes an option to actively update slides included in the plurality of slides based on changes made to the slides in the presenter dashboard pane.

12. A system comprising:
a processor configured to execute instructions to cause a virtual meeting platform to perform a process comprising:
executing a virtual meeting during which the virtual meeting platform live streams video content to a plurality of participants;
executing, during the virtual meeting, a collaborative slideshow presentation, the executing of the collaborative slideshow presentation including accessing a collaborative slideshow file from a storage location of a file sharing platform and using the collaborative slideshow file to provide, for display within a graphical user interface view, the collaborative slideshow presentation to the plurality of participants;
facilitating, during the virtual meeting and based on user designated control permissions, two or more participants included in the plurality of participants having concurrent control of the collaborative slideshow presentation; and
granting, by the virtual meeting platform based on a permissions control feature, a first level of control of the collaborative slideshow presentation to a first participant included in the plurality of participants during the collaborative slideshow presentation and a second level of control of the collaborative slideshow presentation to a second participant included in the plurality of participants, the first level of control different than the second level of control.

13. The system of claim 12, wherein the accessing of the collaborative slideshow file from the storage location of the file sharing platform includes leveraging file sharing platform access permissions of a participant included in the plurality of participants.

14. The system of claim 12, wherein:
the graphical user interface view includes a slide presentation pane that depicts a slide included in a plurality of slides of the collaborative slideshow presentation; and
the slide presentation pane depicts the collaborative slideshow presentation as viewed by the plurality of participants.

15. The system of claim 14, wherein:
the graphical user interface view further includes a presenter dashboard pane that is presented individually to each of the two or more participants that collaboratively control the collaborative slideshow presentation; and
the presenter dashboard pane includes one or more user-selectable control options that facilitate the two or more participants collaboratively interacting with the plurality of slides during the collaborative slideshow presentation.

16. The system of claim 15, wherein:
the presenter dashboard pane depicts additional slides included in the plurality of slides of the collaborative slideshow presentation; and
the additional slides depicted in the presenter dashboard pane are browsable and selectable by the two or more participants independently from the slide currently depicted in the slide presentation pane.

17. The system of claim 12, wherein the process further comprises:

receiving, during the virtual meeting, a user input to grant control of the collaborative slideshow presentation to an additional participant included in the plurality of participants; and granting, based on the user input, the additional participant control of the collaborative slideshow presentation concurrently with the two or more participants.

18. A computer program product embodied in a non-transitory computer readable storage medium and comprising computer instructions that cause a virtual meeting platform to perform a process comprising:

executing a virtual meeting during which the virtual meeting platform live streams video content to a plurality of participants;

executing, during the virtual meeting, a collaborative slideshow presentation, the executing of the collaborative slideshow presentation including accessing a collaborative slideshow file from a storage location of a file sharing platform and using the collaborative slideshow file to provide, for display within a graphical user interface view, the collaborative slideshow presentation to the plurality of participants;

facilitating, during the virtual meeting and based on user designated control permissions, two or more participants included in the plurality of participants concurrently controlling presentation of the collaborative slideshow presentation; and granting, based on a permissions control feature, a first level of control of the collaborative slideshow presentation to a first participant included in the plurality of participants during the collaborative slideshow presentation and a second level of control of the collaborative slideshow presentation to a second participant included in the plurality of participants, the first level of control different than the second level of control.

19. The computer program product of claim 18, wherein the accessing of the collaborative slideshow file from the storage location of the file sharing platform includes leveraging file sharing platform access permissions of a participant included in the plurality of participants.

* * * * *